M. LAMPKIN.
WINDSHIELD CLEANER, MIRROR, AND SUN PROTECTOR.
APPLICATION FILED JUNE 11, 1920.
1,371,631.
Patented Mar. 15, 1921.
2 SHEETS—SHEET 1.
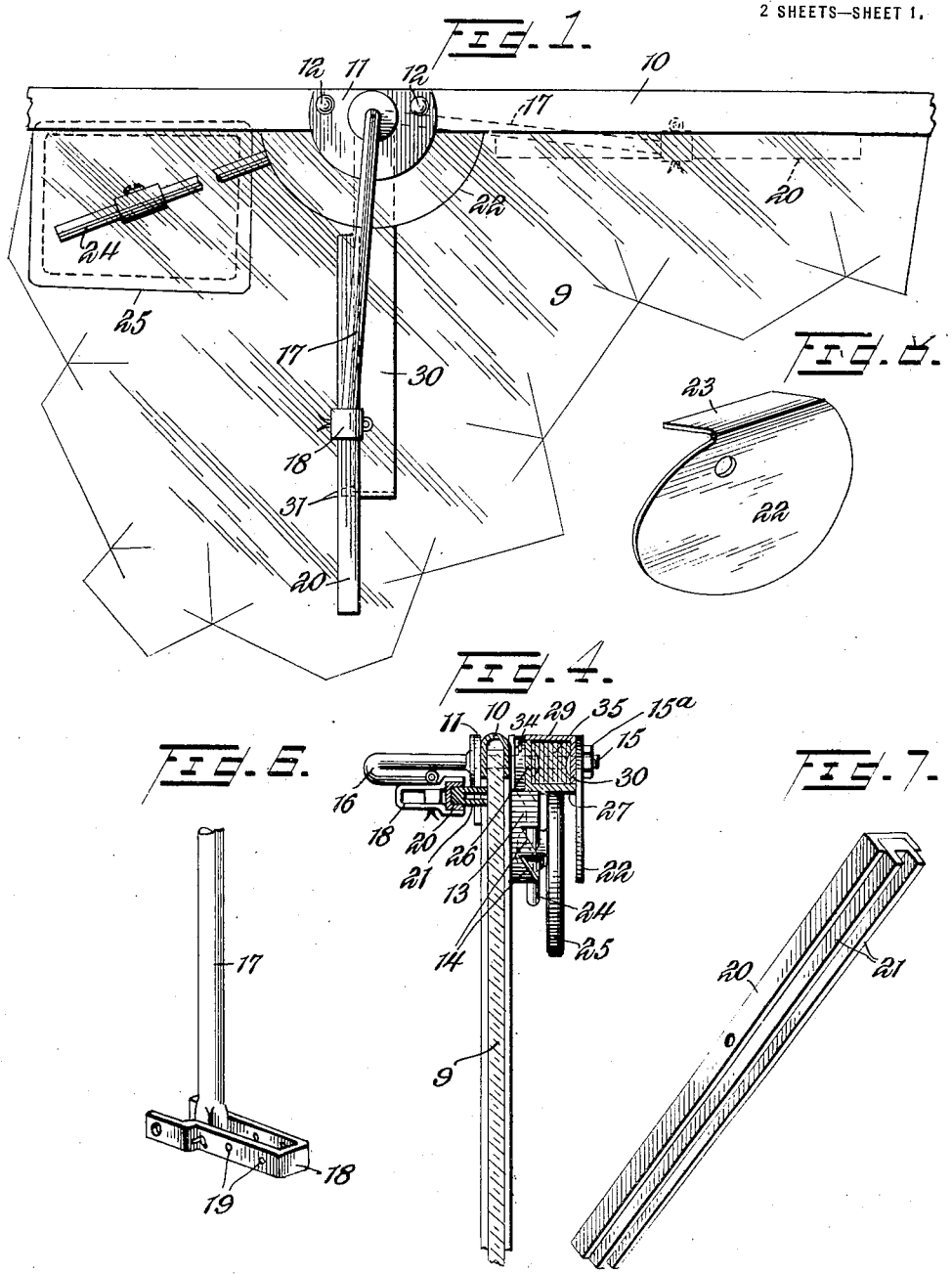
WITNESSES
INVENTOR
Moses Lampkin
BY
ATTORNEY M. LAMPKIN.
WINDSHIELD CLEANER, MIRROR, AND SUN PROTECTOR.
APPLICATION FILED JUNE 11, 1920.
1,371,631.
Patented Mar. 15, 1921.
2 SHEETS—SHEET 2.
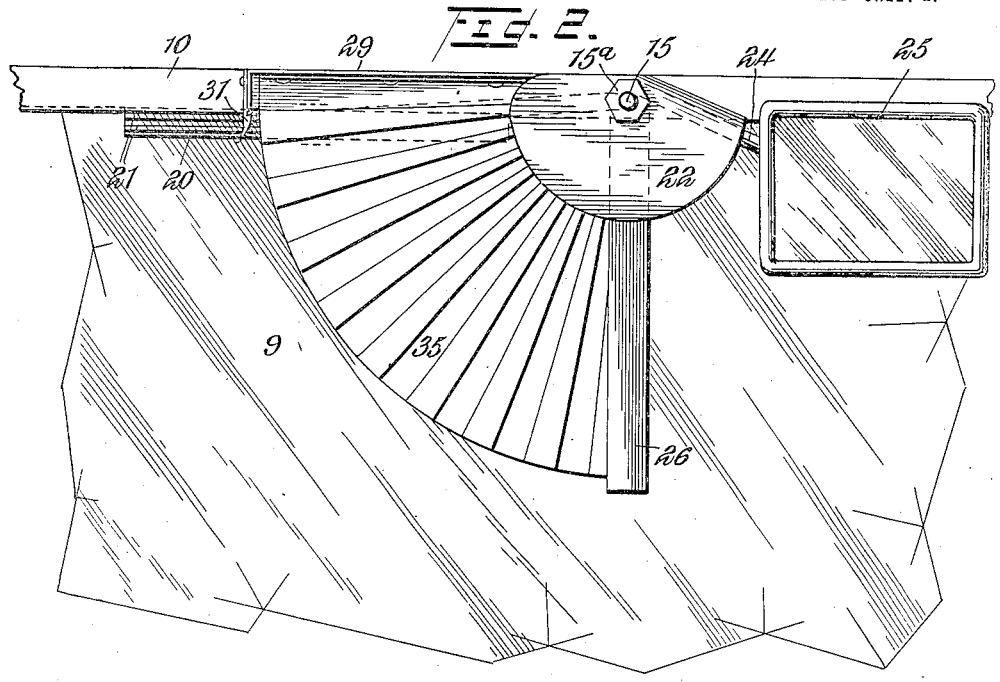
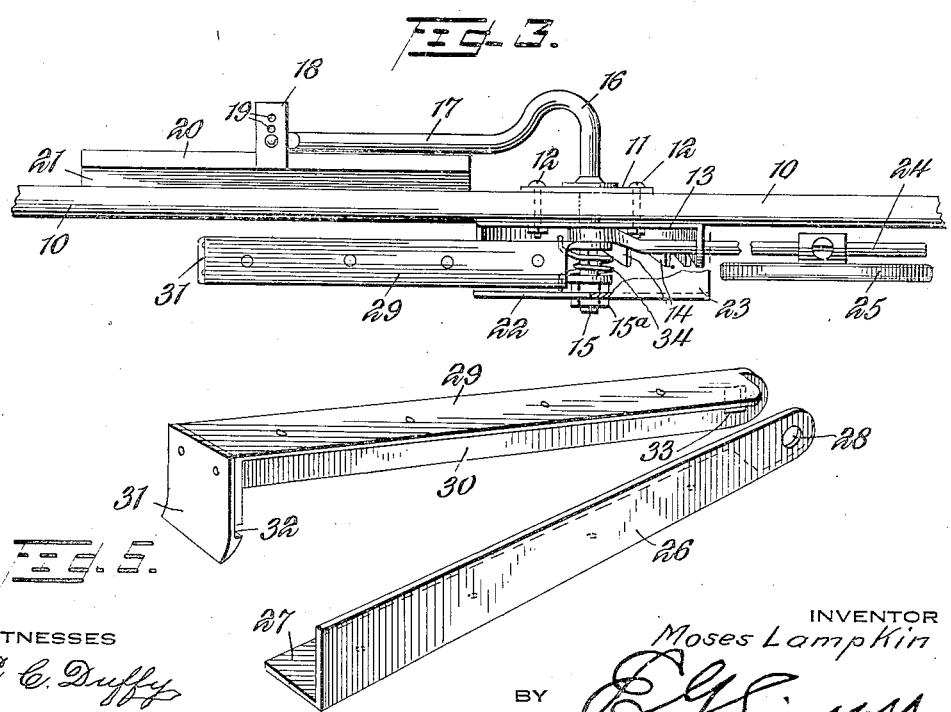
WITNESSES
E. C. Duffy
Philip E. Siggers
INVENTOR
Moses Lampkin
BY
E. G. Siggers
ATTORNEY

UNITED STATES PATENT OFFICE.

MOSES LAMPKIN, OF ST. LOUIS, MISSOURI.

WINDSHIELD-CLEANER, MIRROR, AND SUN-PROTECTOR.

1,371,631.   Specification of Letters Patent.   Patented Mar. 15, 1921.

Application filed June 11, 1920. Serial No. 388,360.

*To all whom it may concern:*

Be it known that I, MOSES LAMPKIN, a citizen of the United States, residing at St. Louis city and State of Missouri, have invented a new and useful Windshield-Cleaner, Mirror, and Sun-Protector, of which the following is a specification.

This invention relates to improvements in wind shield attachments.

The general object of the invention is to provide a wind shield attachment including a cleaner for the outside of the wind shield whereby drops of water may be wiped off the same, means for protecting the eyes of the driver from the glare of the sun or of headlights, and a mirror by which the driver may see vehicles approaching from the rear.

A more specific object is to provide a wind shield attachment including a sun protector and a wiper wherein these two elements are so mounted and connected that the glare protector may be used as a lever for manipulating the wiper.

Other objects are to provide a wind shield attachment which is easily secured in place, which is adjustable to meet with all conditions of driving, which may be readily manufactured, and which will not detract from the appearance of the car.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:—

Figure 1 is an elevation showing the attachment in place on a wind shield, the view being from the outside of the wind shield.

Fig. 2 is an elevation from the inside, showing the sun protector in active position.

Fig. 3 is a top plan view of the device as illustrated in Fig. 2, parts being broken away to disclose the construction more clearly.

Fig. 4 is a vertical cross-sectional view through the wind shield and attachment.

Fig. 5 is a perspective view of the two angle arms forming the frame or housing of the sun protector.

Fig. 6 is a detail perspective view illustrating the connection between the lever arm and the yoke which joins the lever arm to the wind shield cleaner.

Fig. 7 is a perspective view of the wind shield cleaner.

Fig. 8 is a perspective view of the plate which forms a casing or housing for parts of the attachment.

The wind shield upon which the device is mounted is illustrated as comprising the plate glass 9 and the frame 10. Only so much of the wind shield is shown as is necessary for an understanding of the invention. A pair of plates 11 and 13 are mounted upon the upper edge of the wind shield, the plate 11 being on the outside and the plate 13 on the inside. Bolts or the like 12 pass through the frame 10 to hold the two plates 11 and 13 in position. The plate 13, as seen in Fig. 4, has an arcuate flange on its lower side, said flange being disposed at right angles to the wind shield and having a series of ratchet teeth 14 provided therein.

Passed centrally through the plates 11 and 13 and through the wind shield frame 10 is one end of a lever arm 15, the two plates providing bearings for said lever arm so that the latter may swing upon a horizontal axis. The lever arm 15 may rest in a groove provided in the upper edge of the glass of the wind shield, or may be passed entirely through said glass. That part of the arm 15 which is outside of the wind shield has a bend 16, as seen in Figs. 3 and 4, and the lever arm at the outer end of said bend is continued in a straight portion 17 parallel to the plane of the wind shield. A yoke 18 embraces the outer end of the arm 17 and is connected thereto by any desirable means, as a screw, bolt or cotter pin passed through one of a plurality of perforations 19 provided in the yoke. The ends of the yoke, which yoke is U-shaped as seen in Fig. 6, are fixed to an intermediate portion of a wind shield wiper or cleaner shown by itself in Fig. 7. This wind shield cleaner comprises a backing of any desirable relatively stiff material which may be exposed to the weather without deterioration of appearance, said backing 20 firmly holding a cleaning element 21, preferably of heavy rubber, and having a pair of webs adapted to engage the outer surface of the wind shield to wipe the same free from drops of water. The webs of the rubber wiping element extend in spaced parallel relation the entire length of the cleaner and when the arm 17 is swung about its axis, an arcuate segment of the wind shield is cleaned, of sufficiently large area to allow the driver to see clearly all parts of the road.

The inner arm 15 of the lever has a squared portion, as shown in Fig. 3. The outer end of the arm 15 is screw-threaded whereby a nut 15$^a$ may be received thereon, said nut 15$^a$ holding in place a plate 22 having an inturned flange 23. The plate 22 provides, in connection with the plate 13, a housing for parts of the attachment and gives a more finished appearance to the attachment.

A rod 24 is mounted upon the arm 15 adjacent the plate 13, as seen in Fig. 3, and passes through the arcuate flange of the plate 13 so as to be held in fixed relation to said plate. The rod 24 provides a support by which a mirror 25 of any desirable size and construction may be supported. The mirror 25 allows the driver to see vehicles approaching from the rear, and is so secured upon the rod 24 that it may be tilted to any desired angle and secured in the preferred position along the rod.

A sun protector comprising a pair of angle arms and a fan-like webbing joining said arms is mounted upon the arm 15 between the plates 22 and 13. The two arms of the sun protector are each angular, and together, when in closed position, provide a housing for the webbing, as seen in Fig. 4. The arm 29 has a flange 30 at right angles thereto, and a latch plate 31 at its outer end provided with a flared extremity and a notch 32. The inner end of the flange 30 has a square hole 33 fitting over the squared portion of the arms 15; thus when the arm 29 is swung, the lever arm must swing with it so as to effect wiping of the wind shield. The other arm 26 of the sun protector has a flange 27 at right angles and a bore 28 at its inner end, the arm 26 being freely movable on the lever arm 15 as an axis. A coil spring 34 is mounted on lever arm 15 between the flanged arms 26 and 29 with its ends engaged with the flanged arms so as to exert a normal tendency upon said arms to remain in closed position such as that shown in Fig. 4. The flanges 27 and 30 are connected by a fan webbing 35 which may be of any desirable material of a nature to shield the eyes from the glare of the sun or from the headlights of an approaching automobile.

When the arm 26 is in closed position, the outer edge of its flange 27 will snap into the notch 32 so that the two flanged arms are latched together. When it is desired to open the sun protector to the position shown in Fig. 2, the latch is released and the arm 26 is swung against the resistance of spring 34 until the webbing has been spread to the desired extent, when the flange 27 will be engaged with one of the ratchet teeth 14. This ratchet tooth will prevent the arm 26 from closing. When it is desired to fold the sun protector, all that is necessary to do is to release the flange 27 from engagement with the ratchet tooth, whereupon the arm 26 will close and when the two flanged arms have been latched together the sun protector will remain in folded position without further attention. The arm 29 serves as a lever by which the wind shield cleaner is actuated. Whatever the position taken by the arm 29, the corresponding position will be assumed by the arm 17 on the other side of the wind shield, the arms 29 and 17 being substantially parallel at all times. If desired, the closed or folded sun protector may be used as a handle or lever for swinging the cleaner. The arm 29 may be employed as a handle for swinging the cleaner independently of the position of the arm 26. Whatever position the arm 29 is in, said position will be maintained by the resistance of the webs 21 engaging with the outer surface of the glass of the wind shield. From any given position of the arm 29, the arm 26 may be swung to spread the fan-like webbing outwardly over the inner surface of the wind shield. Thus it is seen that the attachment has a considerable range of adjustability and will provide adequate protection for the eyes of the motorist whatever the driving conditions may be.

What is claimed is:—

1. An automobile wind shield attachment comprising a wind shield wiper and a sun protector mounted on opposite sides of the wind shield, said sun protector comprising a pair of arms joined by a foldable webbing, one of said arms serving as a lever for moving the wiper.

2. An automobile wind shield attachment comprising a wind shield wiper and a sun protector mounted on opposite sides of the wind shield, said sun protector comprising a pair of arms joined by a fan-like webbing, said arms being angular in cross section so as to provide a housing for the webbing when brought together, and means on one of the arms for latching with the other arm, the arm which carries the latch being connected with the wind shield wiper so as to serve as a lever for moving the same.

3. An automobile wind shield attachment comprising a wind shield wiper and a sun protector mounted on opposite sides of the wind shield, said sun protector comprising a pair of arms, a fan-like webbing joining said arms, one of said arms being connected to the wiper whereby it may swing said wiper over the outer surface of the wind shield, said wiper maintaining the arm with which it is connected in any given position by its frictional engagement with the wind shield, the other arm being swingable independently of the wiper, and a spring for tending to move the second-named arm in closed position against the first-named arm.

4. An automobile wind shield attachment comprising a wind shield wiper and a sun protector mounted on opposite sides of the wind shield, said sun protector comprising a pair of angle arms together providing a housing when closed, a fan-like webbing joining said arms and housed thereby, one of said arms serving as a lever for moving the wiper, the other arm being movable independently of the first-named arm and serving to spread the webbing over the inner surface of the wind shield, a spring for imparting to the second-named arm a tendency to move to closed position against the first arm, and a ratchet tooth plate with which the flange of the second-named arm may engage whereby the webbing is maintained in spread condition.

5. An automobile wind shield attachment comprising a wind shield wiper and a sun protector mounted on opposite sides of the wind shield, said sun protector comprising a pair of arms, and a webbing joining said arms, one of said arms being connected to the wiper whereby it may swing said wiper over the outer surface of the wind shield, said wiper maintaining the arm with which it is connected in any given position by its frictional engagement with the wind shield, the other arm being swingable independently of the wiper.

6. An automobile wind shield attachment comprising a wind shield wiper and a sun protector mounted on opposite sides of the wind shield, said sun protector comprising a pair of arms, a webbing joining said arms, one of said arms being connected to the wiper whereby it may swing said wiper over the outer surface of the wind shield, said wiper maintaining the arm with which it is connected in any given position by its frictional engagement with the wind shield, the other arm being swingable independently of the wiper, a spring for moving the last-mentioned arm to closed position, and means for holding the said arm in extended position so as to maintain the webbing in spread condition.

7. A wind shield attachment, comprising a wind shield wiper and a sun protector mounted on opposite sides of the wind shield, and a mirror mounted on the same side of the wind shield as the protector, and means common to said elements for securing the parts in position so that they will not interfere with each other.

In testimony, that I claim the foregoing as my own, I have hereto affixed my signature.

MOSES LAMPKIN.